United States Patent
McKean et al.

(10) Patent No.: US 9,830,092 B2
(45) Date of Patent: Nov. 28, 2017

(54) SOLID STATE DEVICE PARITY CACHING IN A HYBRID STORAGE ARRAY

(71) Applicant: NetApp, Inc., Sunnyvale, CA (US)

(72) Inventors: Brian D. McKean, Longmont, CO (US); Sandeep Kumar R. Ummadi, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 149 days.

(21) Appl. No.: 14/627,825

(22) Filed: Feb. 20, 2015

(65) Prior Publication Data

US 2016/0246519 A1    Aug. 25, 2016

(51) Int. Cl.
G06F 12/00    (2006.01)
G06F 3/06    (2006.01)

(52) U.S. Cl.
CPC .......... G06F 3/0619 (2013.01); G06F 3/0611 (2013.01); G06F 3/0653 (2013.01); G06F 3/0685 (2013.01)

(58) Field of Classification Search
CPC .... G06F 3/0619; G06F 3/0611; G06F 3/0653; G06F 3/0685
See application file for complete search history.

(56) References Cited

U.S. PATENT DOCUMENTS

| 8,549,222 B1 | 10/2013 | Kleiman et al. |
| 8,839,028 B1 | 9/2014 | Polia et al. |
| 9,081,716 B1* | 7/2015 | Karmarkar .......... G06F 11/1076 |
| 2003/0188104 A1* | 10/2003 | Sullivan .............. G06F 12/0897 |
| | | 711/119 |
| 2011/0238885 A1 | 9/2011 | Kitahara et al. |
| 2012/0311195 A1* | 12/2012 | Chang .................. G06F 9/4411 |
| | | 710/14 |
| 2014/0068181 A1 | 3/2014 | Mridha et al. |
| 2015/0003291 A1 | 1/2015 | Oikawa et al. |

OTHER PUBLICATIONS

PCT International Searching Authority, Notification of Transmittal of the International Search Report and the Written Opinion of the International Searching Authority, or the Declaration, Application No. PCT/US2016/018751 dated Jun. 9, 2016, 7 pages.
Mao,B., et al. "HPOA: A hybrid parity-based disk array for enhanced performance and reliability"; ACM Transactions on Storage (TOS). vol. 8, No. 1; Publication [Online]. Feb. 2012 [retrieved Apr. 4, 2016]. Retrieved from the Internet: <URL: http:I/or.nsfc.gov.cn/bitstream/00001903-5190177/1/1000003549834.pdf>; pp. 4.1-4.2.

\* cited by examiner

*Primary Examiner* — Gurtej Bansal
(74) *Attorney, Agent, or Firm* — Haynes and Boone, LLP

(57) ABSTRACT

A storage manager can reduce the overhead of parity based fault tolerance by leveraging the access performance of SSDs for the parities. Since reading a parity value can be considered a small read operation, the reading of parity from an SSD is an effectively "free" operation due to the substantially greater SSD read performance. With reading parity being an effectively free operation, placing parity on SSDs eliminates the parity read operations (in terms of time) from the parity based fault tolerance overhead. A storage manager can selectively place parity on SSDs from HDDs based on a criterion or criteria, which can relate to frequency of access to the data corresponding to the parity. The caching criterion can be defined to ensure the reduced overhead gained by reading parity values from a SSD outweighs any costs (e.g., SSD write endurance).

19 Claims, 11 Drawing Sheets

HYBRID STORAGE ARRAY

SOLID STATE DEVICE PARITY CACHING IN A HYBRID STORAGE ARRAY

BACKGROUND

Aspects of the disclosure generally relate to the field of storage systems, and more particularly to storing parity in storage systems.

Although solid state storage drives are available, storage solutions have been offered with hard disk drive arrays because of the greater cost of solid state drives. As the cost of solid state drives (SSDs) has decreased, storage solutions have increased use of the solid state drives due to the performance benefits of SSDs. However, SSDs are still more expensive than hard disk drives (HDDs) and numerous HDD based storage systems are already deployed. To gain some of the performance benefits of SSDs while controlling costs, some storage solutions incorporate both types of storage devices. These storage solutions are referred to as hybrid storage arrays or hybrid arrays.

SUMMARY

A storage manager can reduce the overhead of parity based fault tolerance by leveraging the access performance of SSDs for the parities. Since reading a parity value can be considered a small read operation, the reading of parity from an SSD is an effectively "free" operation due to the substantially greater SSD read performance. With reading parity being an effectively free operation, placing parity on SSDs eliminates the parity read operations (in terms of time) from the parity based fault tolerance overhead. A storage manager can selectively place parity on SSDs from HDDs based on a criterion or criteria, which can relate to frequency of access to the data corresponding to the parity. The caching criterion can be defined to ensure the reduced overhead gained by reading parity values from a SSD outweighs any costs (e.g., SSD write endurance).

BRIEF DESCRIPTION OF THE DRAWINGS

Aspects of the disclosure may be better understood by referencing the accompanying drawings.

FIG. 1 illustrates initial caching of a recalculated parity, and FIG. 2 illustrates use of the cached parity.

DESCRIPTION

Figure 1:
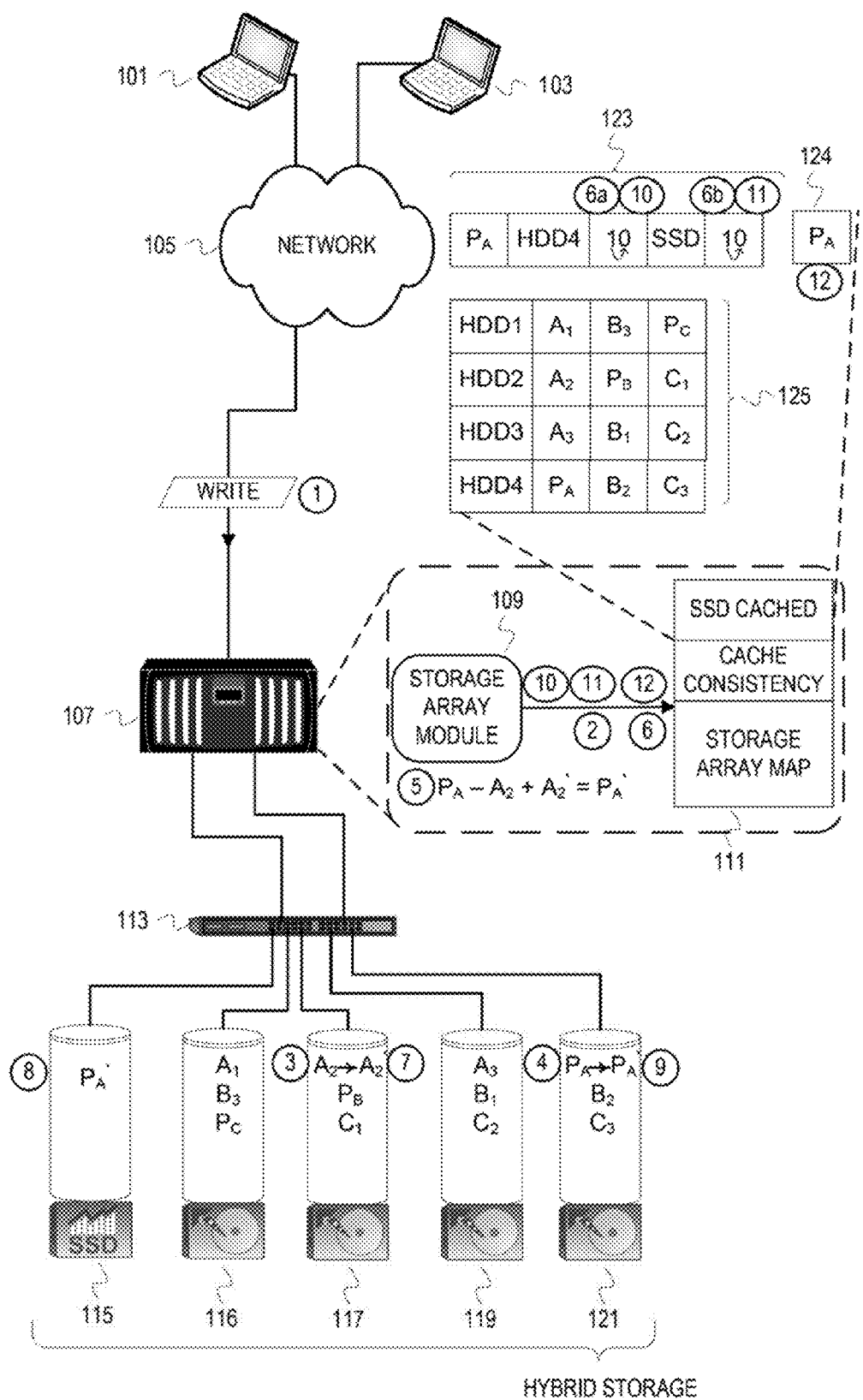
FIGS. 1 and 2 illustrate example single parity caching in a solid state drive of a hybrid storage array.

The description that follows includes example systems, methods, techniques, and program flows that embody aspects of the disclosure. However, it is understood that this disclosure may be practiced without these specific details. For instance, this disclosure refers to standard RAID 5 and RAID DP in illustrative examples. But aspects of this disclosure can be applied to other Storage Networking Industry Association (SNIA) defined standard parity based fault tolerance storage configurations (e.g., RAID 6) and other non-standard parity based fault tolerance storage configurations (e.g., RAID 5E). In other instances, well-known instruction instances, protocols, structures and techniques have not been shown in detail in order not to obfuscate the description.

Introduction

In a hybrid storage array, the SSDs and HDDs can be used regardless of device type. For instance, data blocks can be distributed across the drives without regard to the drive being a SSD or a HDD. In some hybrid storage array configurations, some or all of the SSDs can be used as if a cache for the HDDs within the storage array. This is in addition to any caching done at a storage manager for all of the storage arrays managed by the storage manager. When an SSD is used as cache for the hybrid storage array, the data blocks are written to the caching SSD and the HDDs of the hybrid storage array in accordance with a caching algorithm. Regardless of the particular caching scheme, the hybrid storage array can be configured in accordance with a fault tolerance configuration, such as a RAID configuration.

A RAID configuration provides fault tolerance for a storage array. The benefit of fault tolerance, however, incurs overhead for each data update. In a single parity configuration, this overhead can generally be quantified as four input/output (I/O) operations:
1) reading the data block impacted by the update,
2) reading the parity for the stripe that includes the impacted data block,
3) writing the updated data, and
4) writing the updated parity.

In a two parity configuration, such as RAID 6 or RAID DP, this overhead can generally be quantified as six I/O operations:
1) reading the data block impacted by the update,
2) reading the first parity for the stripe that includes the impacted data block,
3) reading the second parity for the stripe that includes the impacted data block,
4) writing the updated data,
5) writing the updated first parity, and
6) writing the updated second parity.

Overview

A storage operating system or storage manager can reduce the overhead of parity based fault tolerance by leveraging the access performance of SSDs for the parities. Although performance can vary across SSDs, small/random read operations have been measured in SSDs to be 100-1000× times faster than in HDDs. Since reading a parity value can be considered a small read operation, the reading of parity from an SSD is an effectively "free" operation due to the substantially greater SSD read performance. With reading parity being an effectively free operation, placing parity on SSDs eliminates the parity read operations (in terms of time) from the parity based fault tolerance overhead. A storage operating system or storage manager can selectively place parity on an SSD of a hybrid storage array based on a criterion or criteria, which can relate to frequency of access to the data corresponding to the parity. This "caching criterion" can be defined to ensure the reduced overhead gained by reading parity values from a SSD outweighs any costs (e.g., SSD write endurance).

Example Illustrations

Figure 2:
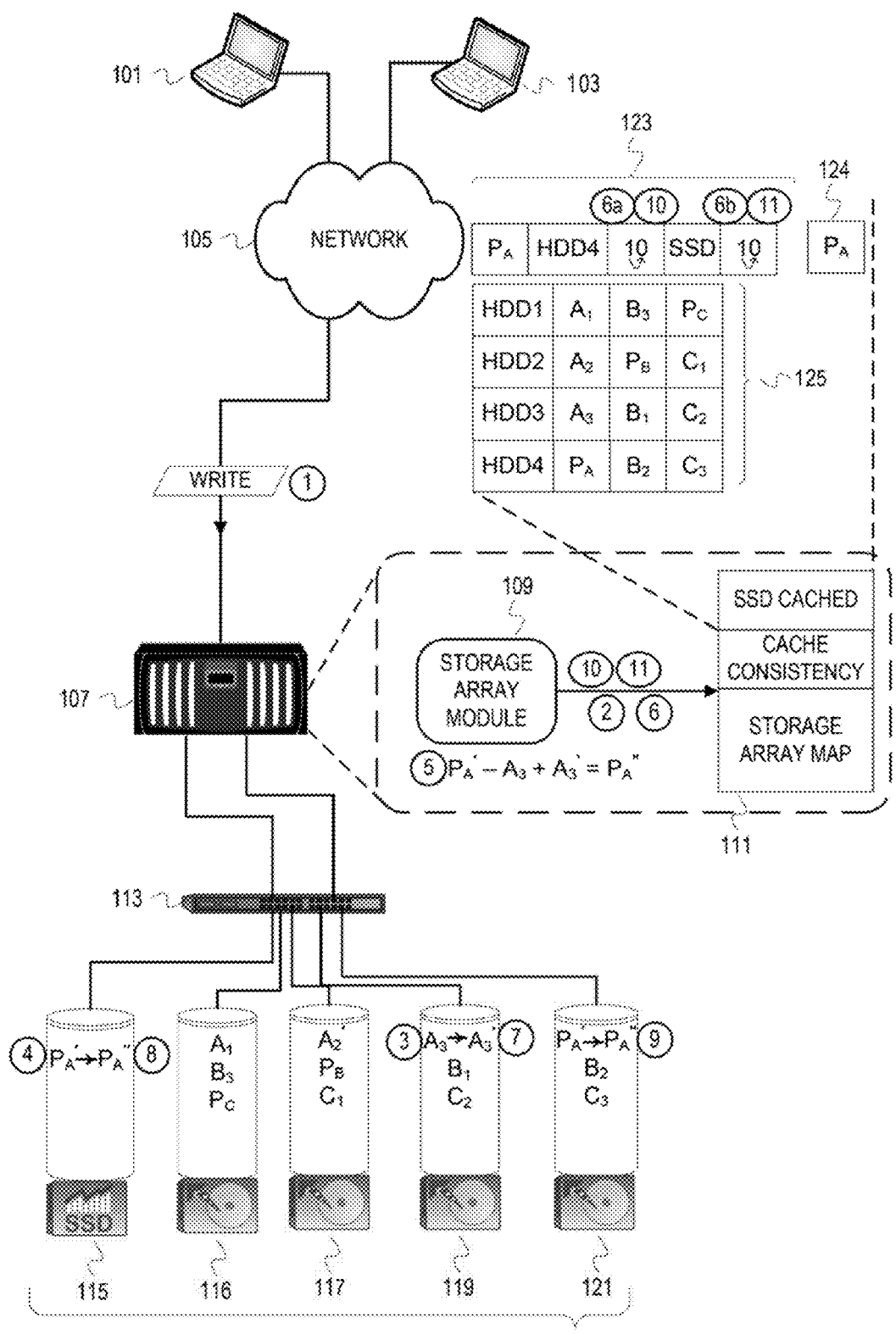

FIGS. 1 and 2 illustrate example single parity caching in a solid state drive of a hybrid storage array. FIG. 1 illustrates initial caching of a recalculated parity, and FIG. 2 illustrates use of the cached parity. Both FIG. 1 and FIG. 2 are annotated with a series of numbers, 1-12. These numbers represent stages of operations. Although these stages are ordered for this example, the stages illustrate one example to aid in understanding this disclosure and should not be used to limit the claims. Claimed subject matter can vary with respect to the order and some of the operations.

FIG. 1 depicts client devices 101, 103 in communication, via a network 105, with a storage manager 107. The storage manager 107 manages access to at least one hybrid storage array. In this example illustration, the storage manager 107 accesses the storage array via a network element 113 (e.g., a switch). The storage array includes a solid state drive 115 and four hard disk drives 116, 117, 119, 121. For this illustration, data caching in the solid state drive 115 is not depicted to avoid distracting from the description of the parity caching. But both parity and data can be cached in the solid state drive 115 for the HDDs of the storage array. The storage array already hosts three stripes of data. These stripes (A, B, and C) are logically depicted in a horizontal arrangement across the storage array. Stripe A consists of data block $A_1$, data block $A_2$, and data block $A_3$. The parity for stripe A is indicated as $P_A$. Stripe B consists of data block $B_1$, data block $B_2$, and data block $B_3$. The parity for stripe B is indicated as $P_B$. Stripe C consists of data block $C_1$, data block $C_2$, and data block $C_3$. The parity for stripe C is indicated as parity $P_C$.

FIG. 1 also depicts a storage array module 109 instantiated on the storage manager 107. The storage array module 109 can be an executing program that manages access to the storage array, a card or application specific integrated circuit designed for storage array management, etc. As examples, the storage array module 109 can be a storage operating system, a part of a storage operating system (e.g., a kernel process), a driver (e.g., RAID driver), an add-on to a driver, etc. The storage array module 109 maintains one or more data structures 111. The one or more data structures 111 have data 125, data 123, and data 124. The data 125 indicate locations of data and parity within the storage array ("storage array map"). The data 123 indicate parity consistency status with respect to the cache in the storage manager 107 ("cache consistency status"). The data 124 indicate which parities are cached in the caching SSD ("SSD cached"). Before any SSD caching, the data 124 will be empty or non-existent. Since this illustration stores a parity (when SSD cached) in both the caching SSD and an HDD, the data 123 indicates two consistency statuses for a single parity. The data 123 indicates a consistency status for a parity between the storage controller cache and the HDD and between the storage controller cache and the caching SSD. In the depicted data of the storage array map 125 and the parity status 123, the drives are identified as follows: the solid state drive 115 is 'SSD', the hard disk drive 116 is 'HDD1', the hard disk drive 117 is 'HDD2', the hard disk drive 119 is 'HDD3', and the hard disk drive 121 is 'HDD4'.

At a stage 1, one of the client devices 101, 103 communicate a write request to the storage manager 107 via the network 105. Data in the storage array may have been written by either of both of the client devices 101, 103. The communicated write request will update data already written into the storage array.

At stage 2, the storage array module 109 initially processes the write request. The storage array module 109 determines that the write request impacts the data block $A_2$. The write request can indicate a file handle and offset used by the storage array module 109 to determine the impacted data block. The storage array module 109 accesses the data structure 111 to determine location of the data block $A_2$. With the storage array map 125, the storage array module 109 determines that the data block $A_2$ is stored on the hard disk drive 117 and determines that the parity $P_A$ (i.e., the parity value for stripe A) is stored on the hard disk drive 121. The storage array module 109 also accesses the SSD cached data 123 and determines that the parity $P_A$ is not currently cached.

After determining their locations, the storage array module 109 obtains $A_2$ and $P_A$. At stage 3, the storage array module 109 reads $A_2$ from the hard disk drive 117. At stage 4, the storage array module 109 reads $P_A$ from the hard disk drive 121.

After obtaining the impacted data block and the corresponding parity value, the storage array module 109 generates an updated data block and recalculates the corresponding parity. The updated data block is depicted as $A_2'$. At stage 5, the storage array module 109 recalculates the parity for stripe A to reflect the change to the data block $A_2$. For this illustration, parity is generated by XORing data blocks of a stripe. To calculate the new parity value, the data block $A_2$ is "subtracted" from the parity value $P_A$, and the updated data block $A_2'$ is added to the result of the subtraction. With XORing, the addition and subtraction are XOR operations. The recalculated parity value is depicted as $P_A'$. Both the updated data block and the recalculated parity are cached in memory of the storage manager 107.

At stage 6, the storage array module 109 updates the cache consistency status 123 for the parity for stripe A. Stage 6 is decomposed into stages 6a and 6b and depicted adjacent to the cache consistency status 123. Again, the indication of "a" and "b" are used to illustrate the different changes and not to indicate any particular order. At stage 6a, the storage array module 109 indicates that the stripe A parity as stored in the storage manager 107 is inconsistent with the stripe A parity in the hard disk drive 121. At stage 6b, the storage array module 109 indicates that the stripe A parity as stored in the storage manager 107 is inconsistent with the stripe A parity in the solid state drive 115. In this case, the inconsistency with the solid state drive 115 exists because there is no stripe A parity in the solid state drive 115 yet. The storage array module 109 could, instead, initially use a null value or other similar indication in the cache consistency status 123 to indicate that the parity is not yet stored in the solid state drive 115. As another example, the storage array module 109 may not maintain a consistency status for the parity until the parity is actually stored in the solid state drive 115. Parity is likely not cached until a criterion or criteria are satisfied. But this example assumes that a parity caching criterion is satisfied. In FIG. 1, the cache consistency status 123 is structured to index by parity (i.e., each row corresponds to parity). For each parity of the hybrid storage array, the cache consistency status 123 indicates a consistency bit for each location beyond the storage controller cache and those locations. In this case, those locations include the caching SSD and the HDD. Initially, cache consistency status 123 can indicate null values for the locations beyond the storage controller cache.

After updating parity status, the storage array module 109 writes the updated data block and the recalculated parity to the storage array. At stage 7, the storage array module 109 writes $A_2'$ to the hard disk drive 117. At stage 8, the storage array module 109 writes $P_A'$ to the solid state drive 115. At stage 9, the storage array module 109 writes $P_A'$ to the hard disk drive 121.

Each drive will return an acknowledgement to the storage manager 107 after successful completion of the requested write and cache consistency status will be updated accordingly. At stage 10, the storage array module 109 updates the cache consistency status 123 in accordance with the acknowledgement received from the hard disk drive 121 to indicate consistency with the storage controller cache. After the updated data block has been successfully written by the hard disk drive 117, the storage array module 109 will update cache consistency status for the data block (not depicted). After the solid state drive 115 indicates successful completion of the requested write, the storage array module 109 updates the cache consistency status for the SSD cached stripe A parity to indicate consistency between the SSD cache and the storage controller cache for the stripe A parity.

Since $P_A$ is now being cached, the storage array module 109 also updates data to reflect the SSD caching of parity. At stage 12, the storage array module 109 updates the SSD cached data 124 to indicate $P_A$. For this illustration, this update can be done concurrently with stage 11, after acknowledgement from the solid state drive 115, or after stage 11. If done prior to stage 11, the cache consistency status 123 could be used to prevent an attempt to read $P_A$ from the caching SSD prematurely or the SSD cached data 124 can indicate that $P_A$ is not yet ready to be read from the caching SSD.

FIG. 2 continues the illustration from FIG. 1 and depicts use of the SSD cached, recalculated parity. For FIG. 2, one of the client devices 101, 103 sends another write request that impacts a data block protected by the cached stripe A parity at stage 1. Although some of the operations between FIGS. 1 and 2 are similar, stripe A parity is not read from a hard disk drive in FIG. 2.

At stage 2, the storage array module 109 processes the write request. The storage array module 109 determines that the write request impacts the data block $A_3$. The write request can indicate a file handle and offset used by the storage array module 109 to determine the impacted data block. The storage array module 109 accesses the one or more data structures 111 to determine location of the data block $A_3$. With the storage array map 125, the storage array module 109 determines that the data block $A_3$ is stored on the hard disk drive 119 and determines that the stripe A parity is stored on the hard disk drive 121. The storage array module 109 also accesses the SSD cached data 124 and determines that parity for stripe A is currently cached in the solid state drive 115. Since the parity for stripe A is SSD cached, the storage array module 109 will read the stripe A parity from the solid state drive 115 instead of the hard disk drive 121.

After determining their locations, the storage array module 109 obtains $A_3$ and $P_A'$. At stage 3, the storage array module 109 reads $A_3$ from the hard disk drive 119. At stage 4, the storage array module 109 reads $P_A'$ from the solid state drive 115. As mentioned earlier, this parity read from the solid state drive 115 instead of the hard disk drive 121 reduces the time overhead for updating parity.

After obtaining the impacted data block and the corresponding parity value, the storage array module 109 generates an updated data block and recalculates the corresponding parity. The updated data block is depicted as $A_3'$. At stage 5, the storage array module 109 recalculates the parity for stripe A to reflect the change to the data block $A_3$. To calculate the new parity value, the data block $A_3$ is subtracted from the parity value $P_A'$, and the updated data block $A_3'$ is added to the result of the subtraction. The recalculated parity value is depicted as $P_A''$.

At stage 6, the storage array module 109 updates the cache consistency status 123 to indicate that the parity for stripe A in both the hard disk drive 121 and the solid state drive 115 are inconsistent with that stored in the storage controller cache. As in FIG. 1, stage 6 is decomposed into stages 6a and 6b. At stage 6a, the storage array module 109 indicates that the stripe A parity as stored in the storage manager 107 is inconsistent with the stripe A parity in the hard disk drive 121. At stage 6b, the storage array module 109 indicates that the stripe A parity as stored in the storage manager 107 is inconsistent with the stripe A parity in the solid state drive 115.

After updating cache consistency status, the storage array module 109 writes the updated data block and the recalculated parity to the storage array. At stage 7, the storage array module 109 writes $A_3'$ to the hard disk drive 119. At stage 8, the storage array module 109 writes $P_A''$ to the solid state drive 115. At stage 9, the storage array module 109 writes $P_A''$ to the hard disk drive 121.

Each drive will return an acknowledgement to the storage manager 107 after successful completion of the requested write and cache consistency will be updated accordingly. At stage 10, the storage array module 109 updates the cache consistency status 123 in accordance with the acknowledgement received from the hard disk drive 121. After the updated data block has been successfully written by the hard disk drive 117, the storage array module 109 will update cache consistency status accordingly (not depicted). After the solid state drive 115 indicates successful completion of the requested write, the storage array module 109 updates the cache consistency status 123 to indicate consistency between the solid state drive 115 and the storage controller cache. Since SSD cache data 124 already indicates SSD caching of the parity for stripe A, no updates are necessary to the data 124.

FIGS. 1 and 2 depicted SSD single parity caching for a hybrid storage array. A storage array can be protected with greater parity, though. A storage array can be protected with double parity, triple parity, etc. Calculation and arrangement of parity can also vary. For example, the first parity of a double parity configuration can be calculated with XOR operations as depicted in FIGS. 1 and 2. The second parity, however, can be calculated with a finite field or Galois field based encoding technique (e.g., Reed Solomon encoding). As another example, parity can be calculated with XOR operations and different data striping. The first parity can be calculated with horizontal striping and XOR operations, and the second parity can be calculated with diagonal striping and XOR operations (i.e., row diagonal parity).

Figure 3:
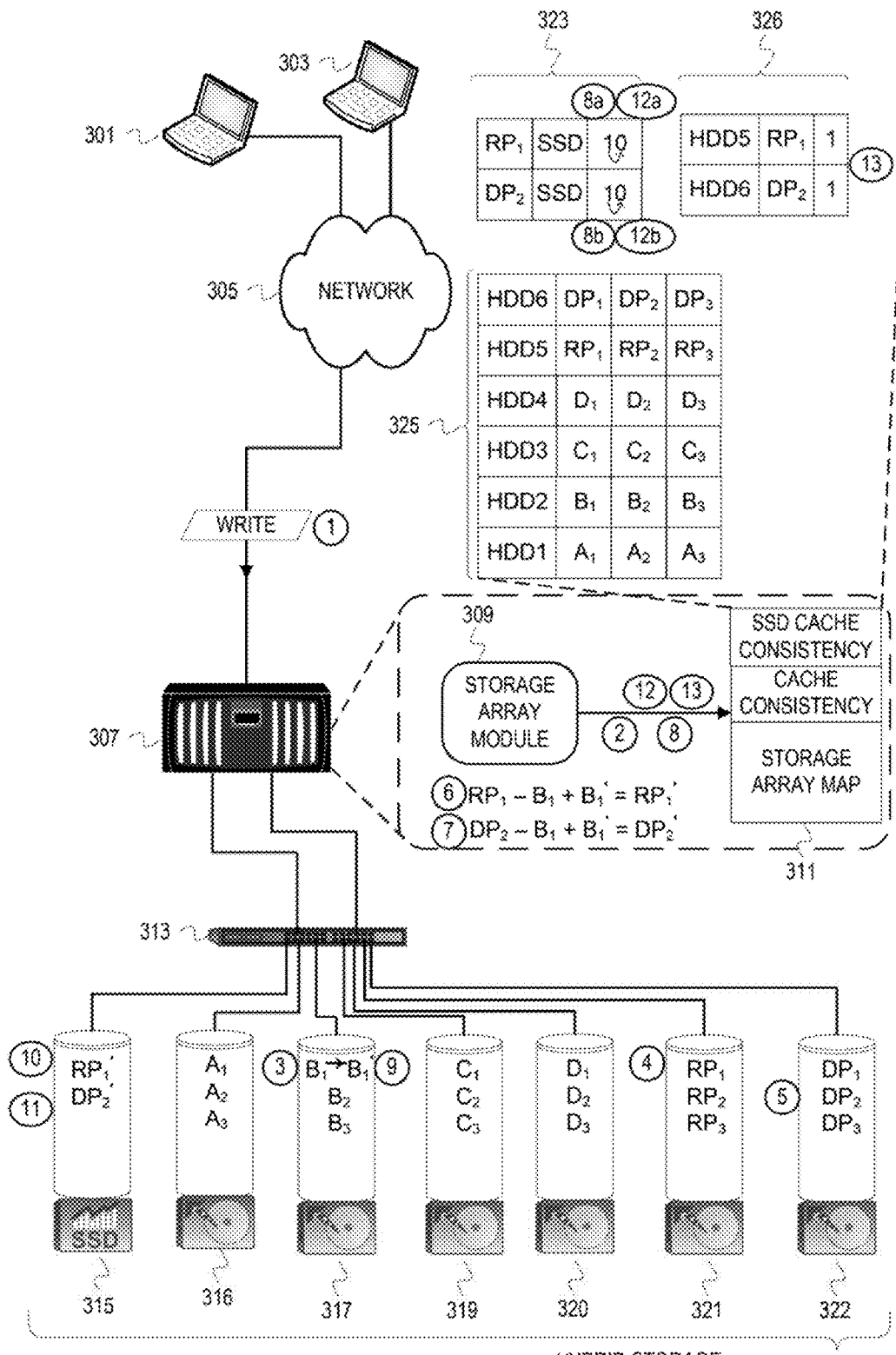
FIG. 3 and FIG. 4 illustrate an example of double parity caching in a hybrid storage array configured with row diagonal parity and dedicated parity drives.
Figure 4:
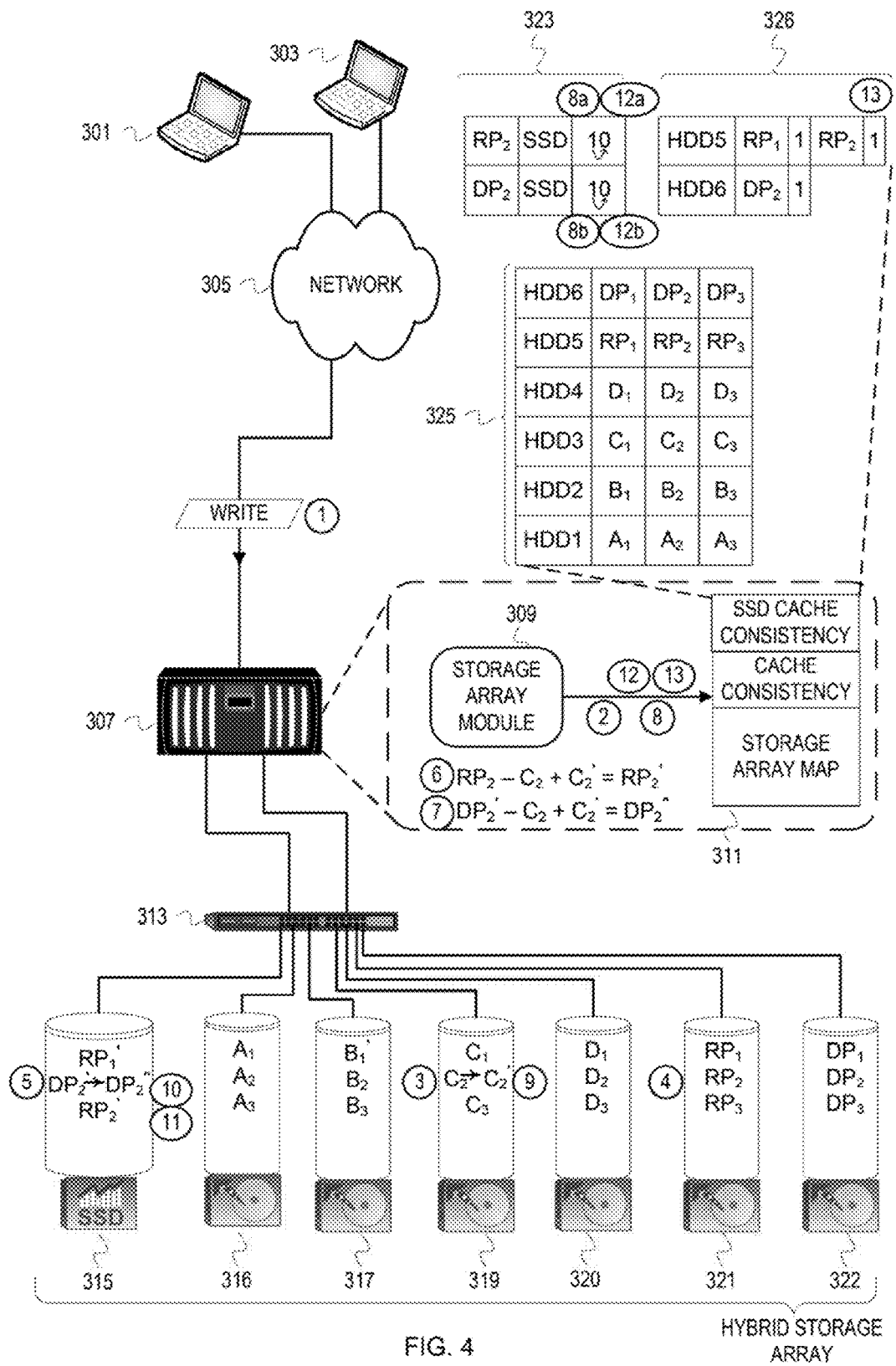

FIG. 3 and FIG. 4 illustrate an example of double parity SSD caching in a hybrid storage array configured with row diagonal parity and dedicated parity drives. In FIGS. 1 and 2, cache consistency was maintained for the storage controller cache. The storage controller cache had 2 parity caching relationships: 1) an HDD relationship, and 2) an SSD relationship. The two relationships could be considered an implicit parity caching relationship between the SSD and the HDDs. If stripe A parity on the SSD is inconsistent with the storage controller cache and stripe A parity on the HDD is consistent with the storage controller cache, then the different consistencies indicate an inconsistency between the SSD and the HDD. Unlike FIGS. 1 and 2, parity caching relationships are maintained between a caching SSD and the HDDs as depicted in FIGS. 3 and 4. FIG. 3 illustrates initial SSD caching of both recalculated parities, and FIG. 4 illustrates use of the SSD cached parities. Both FIG. 3 and FIG. 4 are annotated with a series of numbers 1-13. These numbers represent stages of operations, similar to FIGS. 1 and 2. Although these stages are ordered for this example, the stages illustrate one example to aid in understanding this disclosure and should not be used to limit the claims. Claimed subject matter can vary with respect to the order and some of the operations.

FIG. 3 depicts client devices 301, 303 in communication, via a network 305, with a storage manager 307. The storage manager 307 manages access to a hybrid storage array. In this example illustration, the storage manager 307 accesses the storage array via a network element 313 (e.g., a switch). The storage array includes a solid state drive 315 and six hard disk drives 316, 317, 319, 320, 321, 322. Similar to the example of FIGS. 1 and 2, the solid state drive 315 is configured as a cache for the HDDs of the storage array. The storage array already hosts four groups of data blocks and corresponding parity. The groups of data blocks include data blocks $A_1$-$A_3$, data blocks $B_1$-$B_3$, data blocks $C_1$-$C_3$, and data blocks $D_1$-$D_3$. The row parity stored in the hybrid storage array includes $RP_1$-$RP_3$. The diagonal parity stored in the hybrid storage array includes $DP_1$-$DP_3$.

The storage array module 309 maintains one or more data structures 311. The one or more data structures 311 have storage array map data 325, cache consistency data 323, and SSD cache consistency data 326. In this illustration, the cache consistency 323 indicates consistency of parity between cache memory of the storage manager 307 and the solid state drive 315. The SSD cache consistency data 326 indicates consistency of parity between the caching SSD and relevant HDDs. In the depicted data, the drives are identified as follows: the solid state drive 315 is SSD, the hard disk drive 316 is HDD1, the hard disk drive 317 is HDD2, the hard disk drive 319 is HDD3, the hard disk drive 320 is HDD4, the hard disk drive 321 is HDD5, and the hard disk drive 322 is HDD6.

At stage 1, one of the client devices 301, 303 communicates a write request to the storage manager 307 via the network 305. Data in the storage array may have been written by either or both of the client devices 301, 303. The communicated write request will update data already written into the storage array.

At stage 2, the storage array module 309 initially processes the write request. The storage array module 309 determines that the write request impacts the data block $B_1$. The storage array module 309 accesses the data structure 311 to determine location of the data block $B_1$ and corresponding parities. The cache consistency data 323 is arranged differently than in FIG. 1 to show that consistency data may not be maintained for a consistency relationship between the storage manager cache and the HDDs, at least with respect to cached SSD parity. With the storage array map 325, the storage array module 309 determines that the data block $B_1$ is stored on the hard disk drive 317. The storage array module 309 also determines that the corresponding row parity $RP_1$ is stored on the hard disk drive 321 and that the corresponding diagonal parity $DP_2$ is stored on the hard disk drive 322. The storage array module 309 also determines that neither the row parity nor the diagonal parity is cached in the solid state drive 315 with the SSD cache consistency data 326 since it will initially have no indication of either parity. Indeed, the SSD cache consistency data 326 may be non-existent or a corresponding structure not instantiated until parity is first cached (or attempted to be cached) in the solid state drive 315.

After determining locations, the storage array module 309 obtains $B_1$, $RP_1$, and $DP_2$. At stage 3, the storage array module 309 reads $B_1$ from the hard disk drive 317. At stage 4, the storage array module 309 reads $RP_1$ from the hard disk drive 321. At stage 5, the storage array module 309 reads $DP_2$ from the hard disk drive 322.

After obtaining the impacted data block and the corresponding parity values, the storage array module 309 generates an updated data block and recalculates the corresponding parity values. The updated data block is depicted as $B_1'$. At stage 6, the storage array module 309 recalculates the row parity value for $B_1$ to reflect the change to the data block $B_1$. For this illustration, row parity is generated by XORing data blocks of a row stripe. To calculate the new row parity value, the data block $B_1$ is subtracted from the parity value for $RP_1$, and the updated data block $B_1'$ is added to the result of the subtraction. The recalculated row parity $RP_1$ is depicted as $RP_1'$. At stage 7, the storage array module 309 recalculates the diagonal parity value for $B_1$ to reflect the change to the data block $B_1$. The diagonal parity is generated by XORing data blocks of a diagonal stripe. To calculate the new diagonal parity value, the data block $B_1$ is subtracted from the parity value of $DP_2$, and the updated data block $B_1'$ is added to the result of the subtraction. The recalculated diagonal parity $DP_2$ is depicted as $DP_1'$.

At stage 8, the storage array module 309 updates the cache consistency data 323 for the recalculated parities. Stage 8 is decomposed into stages 8a and 8b and depicted adjacent to the cache consistency data 323. Again, the indication of "a" and "b" are used to illustrate the different changes and not to indicate any particular order. At stage 8a, the storage array module 309 indicates that $RP_1$ as stored in the storage manager cache is inconsistent with $RP_1$ as stored (or not stored in this case) in the solid state drive 315. As described earlier, in FIG. 1, various techniques can be used to account for the initial lack of any parity in the caching SSD. At stage 8b, the storage array module 309 indicates that $DP_2$ as stored in the storage manager cache is inconsistent with $RP_1$ as stored (or not stored in this case) in the solid state drive 315. In both stages 8a and 8b, the storage array module 309 also updates the cache consistency data 323 to indicate "SSD" in order to explicit identify the consistency relationship as being between the storage manager cache and the caching SSD. Although this is not necessary in some cases, a data structure with the cache consistency data 323 may also indicate consistency between the storage manager cache and other drives (even other caching SSDs) of the storage array. The storage array module 309 also updates cache consistency data for the data block $B_1$ in the hard disk drive 317 to indicate inconsistent (not depicted).

After updating cache consistency data 323, the storage array module 309 writes the updated data block and the recalculated parity values to the storage array. At stage 9, the storage array module 309 writes $B_1'$ to the hard disk drive 317. At stage 10, the storage array module 309 writes $RP_1'$ to the solid state drive 315. At stage 11, the storage array module 309 writes $DP_2'$ to the solid state drive 315.

Each drive will return an acknowledgement to the storage manager 307 after successful completion of the requested write and the storage array module 309 with update cache consistency data accordingly. The storage array module 309 updates the cache consistency data of the data block and parities in accordance with the acknowledgements received from the drives. After the updated data block $B_1$ has been successfully written by the hard disk drive 317, the storage array module 309 will update cache consistency data to indicate consistent (not depicted). After the solid state drive 315 indicates successful completion of both requested writes, the storage array module 309 updates the cache consistency data 323 to indicate consistent for the cached row parity and diagonal parity at stage 12. As with stage 8, stage 12 is decomposed into stages 12a and 12b. The storage array module 309 updates the cache consistency data 323 for $RP_1$ in stage 12a and for $DP_2$ in stage 12b. If the requested write for both parities was a single request, a single confirmation or acknowledgement from the solid state drive 315 can trigger stage 12.

Since $RP_1$ and $DP_2$ are now being SSD cached, the storage array module 309 also creates or updates the SSD cache consistency data 326 to reflect the SSD caching of the parities. At stage 13, the storage array module 309 updates the SSD cache consistency data 326 to indicate that $RP_1$ on the hard disk drive 321 is inconsistent with $RP_1$ on the solid state drive 315. The storage array module 309 also updates the SSD cache consistency data 326 to indicate that $DP_2$ on the hard disk drive 322 is inconsistent with $DP_2$ on the solid state drive 315. For this illustration, this update of the SSD cache consistency data 326 can be done concurrently with stage 12, after stage 12, or after acknowledgement from the solid state drive 315. This update to the SSD cache consistency data 326 could also be done in connection with stage 8. In other words, the SSD cache consistency data 326 can be created/updated based upon an attempted SSD caching of the parity. Regardless of when parity on a HDD is marked as inconsistent with SSD cached parity, it is not updated to consistent or removed until the SSD cached parity is evicted or selected for eviction. If a change in designated parity drive occurs, then the SSD cache consistency data 326 is updated to reflect the change in parity drive.

FIG. 4 continues the illustration from FIG. 3 and depicts use of the cached, recalculated parity values. For FIG. 4, one of the client devices 301, 303 sends another write request that impacts a data block protected by the cached diagonal parity $DP_2'$ at stage 1. Although some of the operations between FIGS. 3 and 4 are similar, the diagonal parity $DP_2'$ is not stored on the hard disk drive 322.

At stage 2, the storage array module 309 processes the write request. The storage array module 309 determines that the write request impacts the data block $C_2$. The storage array module 309 accesses the data structure 311 to determine location of the data block $C_2$. With the storage array map 325, the storage array module 309 determines that the data block $C_2$ is stored on the hard disk drive 319. The storage array module 309 also determines the locations of the parity values for the data block $C_2$. The storage array module 309 determines that the row parity for the data block $C_2$ ($RP_2$) is on the hard disk drive 321 with the storage array map 325 and is not cached (the SSD cache consistency data 326 does not indicate $RP_2$). The storage array module 309 determines that the corresponding diagonal parity for the data block $C_2$ is cached on the solid state drive 315 according to the SSD cached consistency data 326. Thus, the storage array module 309 disregards the inconsistent diagonal parity $DP_2$ on the hard disk drive 322.

After determining locations, the storage array module 309 obtains $C_2$ and the corresponding parities, $RP_2$ and $DP_2'$. At stage 3, the storage array module 309 reads $C_2$ from the hard disk drive 319. At stage 4, the storage array module 309 reads $RP_2$ from the hard disk drive 321. At stage 5, the storage array module 309 reads the diagonal parity value $DP_2'$ from the solid state drive 315 in accordance with the SSD cache consistency data 326.

After obtaining the impacted data block and the corresponding parity values, the storage array module 309 generates an updated data block and recalculates the corresponding parity values. The updated data block is depicted as $C_2'$. At stage 6, the storage array module 309 recalculates the row parity value for $C_2$ to reflect the change to the data block $C_2$. To calculate the new row parity value, the data block $C_2$ is subtracted from the parity value $RP_2$, and the updated data block $C_2'$ is added to the result of the subtraction. The recalculated row parity value is depicted as $RP_2'$. At stage 7, the storage array module 309 recalculates the diagonal parity value for $C_2$ to reflect the change to the data block $C_2$. To calculate the new diagonal parity value, the data block $C_2$ is subtracted from the parity value $DP_2'$, and the updated data block $C_2'$ is added to the result of the subtraction. The recalculated diagonal parity value is depicted as $DP_2''$.

At stage 8, the storage array module 309 updates the cache consistency data 323 to indicate inconsistency between the storage manager cache and the solid state drive 315 for the recalculated parities. Stage 8 is decomposed into stages 8a and 8b again. At stage 8a, the storage array module 309 indicates that $DP_2$ as stored in the storage manager cache is inconsistent with $DP_2$ as stored (or not stored in this case) in the solid state drive 315. At stage 8b, the storage array module 309 indicates that $RP_2$ as stored in the storage manager cache is inconsistent with $RP_2$ as stored (or not stored in this case) in the solid state drive 315. As described earlier, various techniques can be used to account for the initial lack of a parity in the caching SSD. In both stages 8a and 8b, the storage array module 309 also updates the cache consistency data 323 to indicate "SSD" in order to explicit identify the consistency relationship as being between the storage manager cache and the caching SSD, unless already indicated therein. The storage array module 309 also updates status of the data block $C_2$ to indicate that the hard disk drive 319 is inconsistent with the storage manager cache for the data block $C_2$.

After updating consistency data, the storage array module 309 writes the updated data block and the recalculated parity values to the hybrid storage array. At stage 9, the storage array module 309 writes $C_2'$ to the hard disk drive 319. At stage 10, the storage array module 309 writes $RP_2'$ to the solid state drive 315. At stage 11, the storage array module 309 writes $DP_2''$ to the solid state drive 315.

Each drive will return an acknowledgement to the storage manager 307 after successful completion of the requested write and the storage manager will update cache consistency accordingly. After the updated data block $C_2$ has been successfully written by the hard disk drive 319, the storage array module 309 will update cache consistency data accordingly (not depicted). After the solid state drive 315 indicates successful completion of requested writes of the recalculated parities, the storage array module 309 updates the cache consistency data 323 to indicate consistency between the storage manager cache and the solid state drive 315 with respect to the row parity $RP_2$ and the diagonal parity $DP_2$.

Since $RP_2$ is now being SSD cached, the storage array module 309 updates the SSD cache consistency data 326 to reflect the SSD caching of $RP_2$. At stage 13, the storage array module 309 updates the SSD cache consistency data 326 to indicate that $RP_2$ on the hard disk drive 321 is inconsistent with $RP_2$ on the solid state drive 315.

Figure 5:
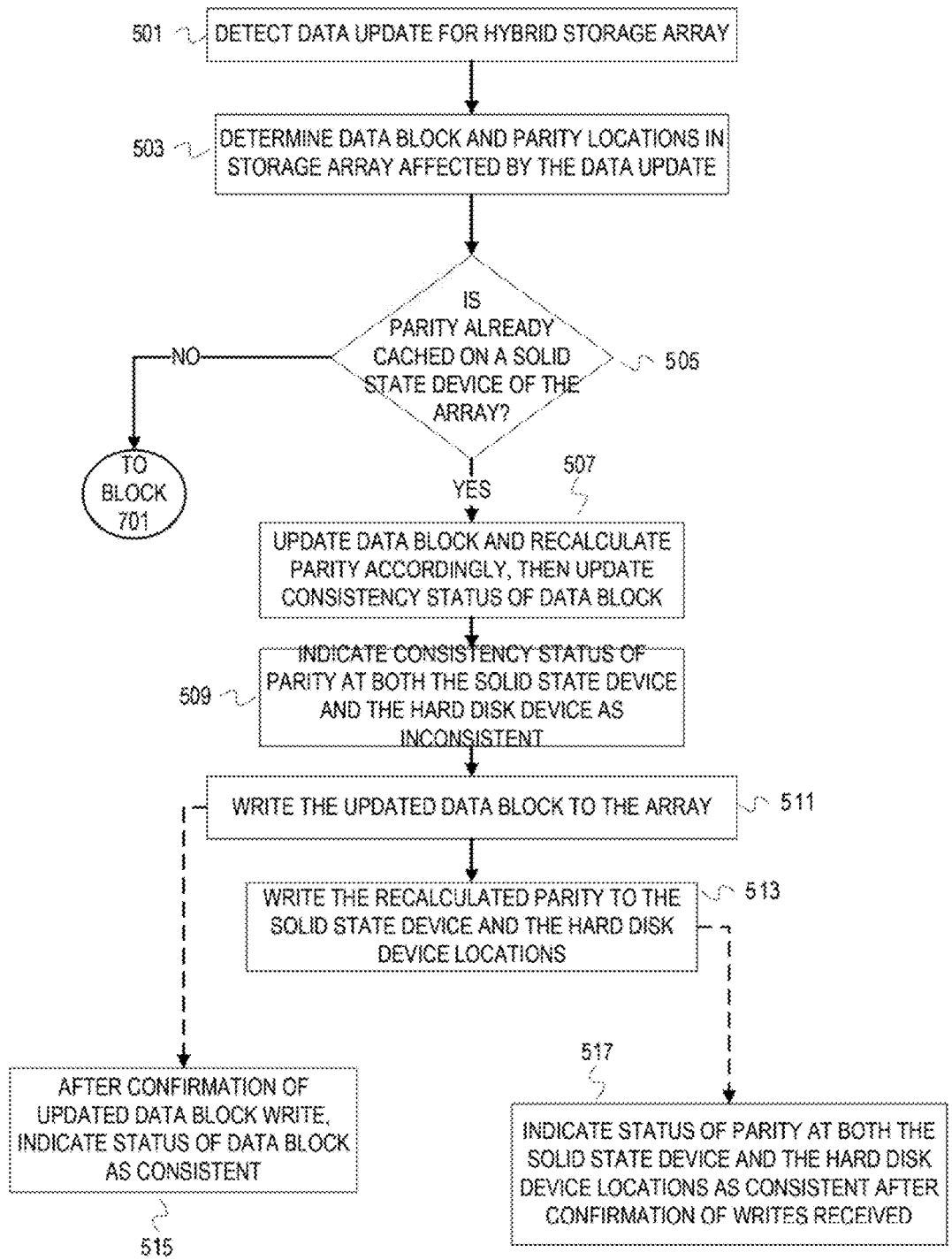
FIGS. 5-7 are flowcharts of example operations for single parity caching on a solid state drive of a hybrid storage array.
Figure 6:
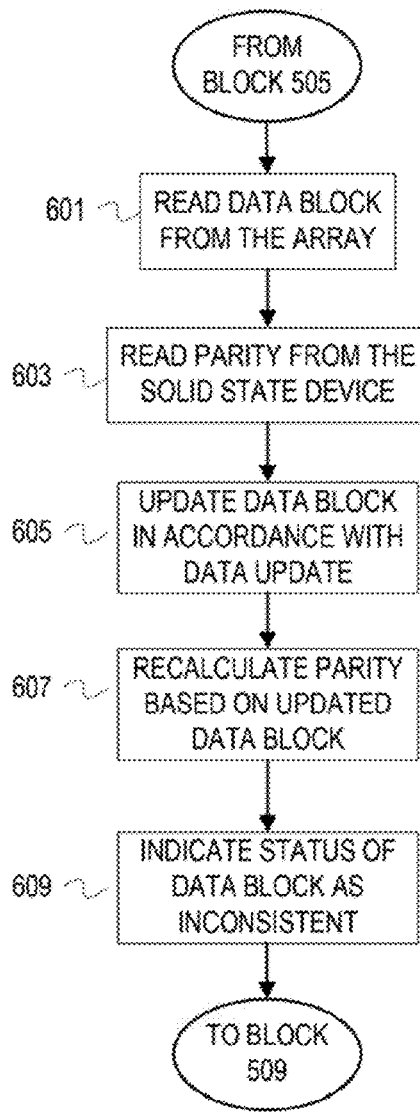
Figure 7:
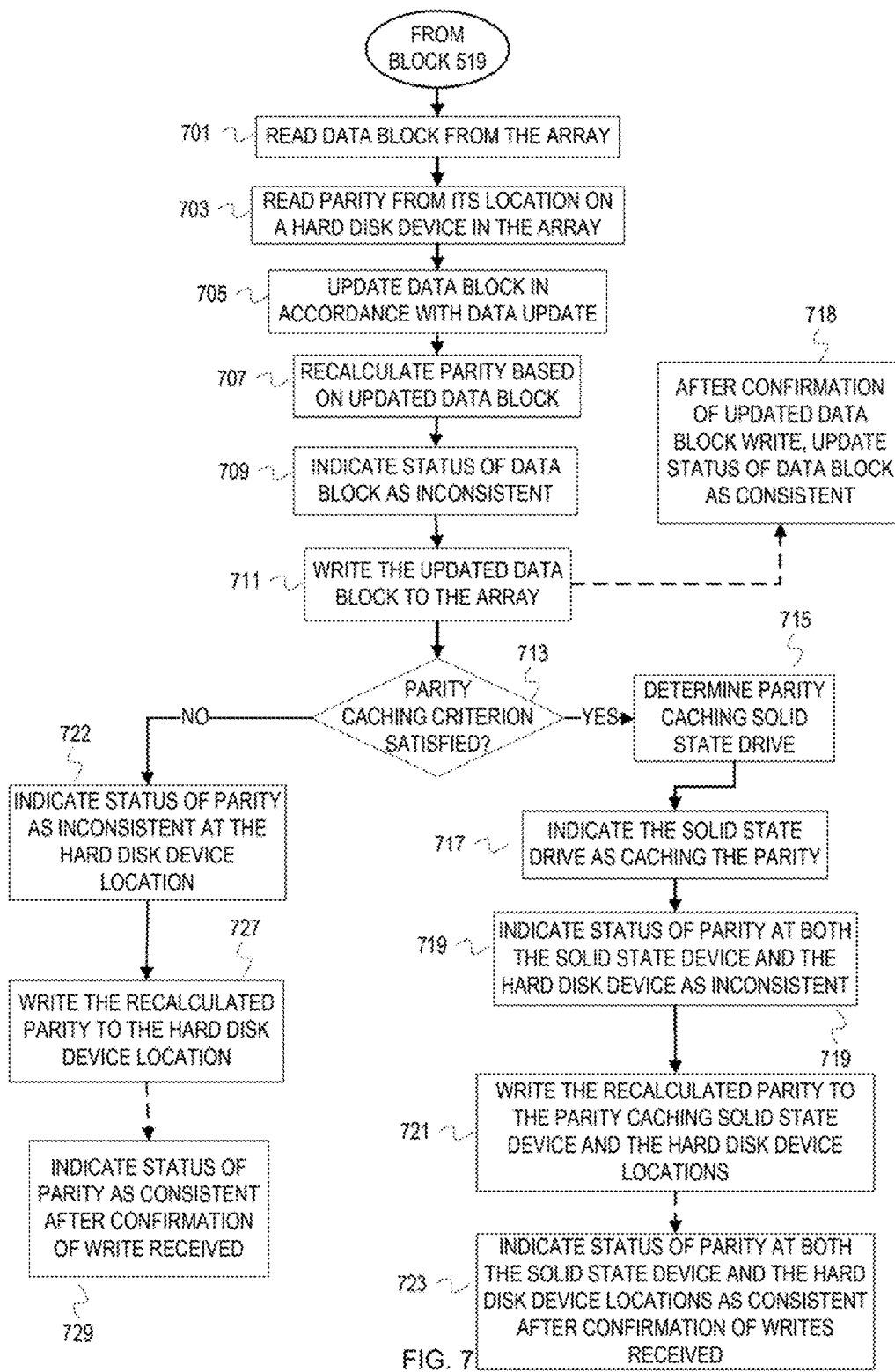

FIGS. 5-7 are flowcharts of example operations for single parity caching on a solid state drive of a hybrid storage array. In the flowchart, dashed lines are used to depict asynchronous operations (e.g., waiting on a response or acknowledgement). For continuity of this description, the example operations are described as if performed by a storage manager. In addition, the parity caching operations can operate regardless of caching/buffering done internally by the storage manager (e.g., in non-volatile random access memory) prior to writes being committed to a storage array.

At block 501, a storage manager detects a data update for a hybrid storage array. The storage manager may receive a write request that impacts at least one data block stored on a storage device in the hybrid storage array, and determines the identity of the impacted data block. The data update may be generated internally with respect to the storage manager. For instance, the data update may be a data synchronization operation.

At block 503, the storage manager determines locations of the data block and corresponding parity value in the hybrid storage array affected by the data update. The storage manager determines locations with mapping data. The mapping data indicates logical addresses used by clients and/or the storage manager and corresponding addresses used by the storage devices. The addresses used by the storage devices may also be logical addresses or may be physical addresses. For example, the storage manager may access mapping data that maps logical block addresses to physical block addresses.

At block 505, the storage manager determines whether the parity is already cached on a solid state storage device of the hybrid storage array. The storage manager can maintain data that indicates whether a parity is cached in a solid state storage device of the hybrid storage array. For example, a data structure can be maintained (e.g., list, array, table, etc.) that indicates cached parities by device identifier (e.g., network address). The device identifier identifies the solid state storage device being used as the caching SSD. As another example, a storage manager can maintain a flag or bit in the storage array map to indicate whether a parity is cached in the caching SSD. If the parity is cached, then control flows to block 507. If the parity is not cached, then control flows to block 701 of FIG. 7.

At block 507, the storage manager updates the impacted data block and recalculates the corresponding parity in accordance with the updated data block. After generating the updated data block and recalculated parity, the storage manager also updates the cache consistency status of the impacted data block.

At block 509, the storage manager indicates two consistency statuses as inconsistent for the corresponding parity that has been recalculated. The storage manager indicates consistency statuses for the hard disk storage device the caching solid state storage device as inconsistent with the storage manager cache.

At block 511, the storage manager writes the updated data block to the hybrid storage array. For instance, the storage manager communicates a write request or write command to the storage device that hosts the impacted data block.

After confirmation that the updated data block has been written, the storage manager updates consistency status for the data block to clean at block 515.

After (or concurrently with) writing the updated data block, the storage manager writes the recalculated parity to the solid state drive being used for parity caching and to the hard disk storage device at block 513. The storage manager communicates different write commands or write requests to the different storage devices. The storage manager can be designed to presume that the write to the solid state storage device will complete more quickly than the write to the hard disk storage device. Thus, the storage manager can prioritize writes to the hard disk storage devices over writes to the solid state storage device.

After confirmation that the parity has been updated at each storage device, the storage manager updates each status accordingly at block 517. After confirmation from the caching SSD, the storage manager updates the consistency status to indicate that the caching SSD is consistent with the storage manager cache with respect to the cached parity. Likewise, the storage manager updates the consistency status for the hard disk storage device with respect to the parity to indicate consistency with the storage manager cache after confirmation from the hard disk storage device.

FIG. 6 depicts example operations that can be performed when the parity corresponding to the impacted data block is already cached on the solid state storage device. The example operations depicted in FIG. 6 can be used to implement block 507.

At block 601, the storage manager reads the impacted data block from the storage array based on the determined location of the impacted data block.

At block 603, the storage manager reads the parity from the solid state storage device.

At block 605, the storage manager updates the obtained data block in accordance with the data update.

At block 607, the storage manager recalculates the parity based on the updated data block.

At block 609, the storage manager indicates an inconsistent status for the impacted data block as stored on the hard disk storage device prior to requesting the updated data block be written to the hybrid storage array.

FIG. 7 depicts example operations when the parity corresponding to the impacted data block has not yet been cached on a solid state storage device of the hybrid storage array.

At block 701, the storage manager reads the impacted data block from the hybrid storage array based on the determined location of the impacted data block.

At block 703, the storage manager reads the parity from the previously determined location, which is a hard disk storage device of the hybrid storage array.

At block 705, the storage manager updates the obtained data block in accordance with the data update.

At block 707, the storage manager recalculates the parity based on the updated data block.

At block 709, the storage manager indicates an inconsistent status for the impacted data block as stored on the determined hard disk storage device with respect to the storage manager cache.

At block 711, the storage manager writes the updated data block to the data block location in the hybrid storage array. After confirmation that the updated data block has been written, the storage manager updates status for the data block to consistent at block 718. Control flows from block 711 to block 713.

At block 713, the storage manager determines whether a parity caching criterion is satisfied. The parity caching criterion can be directly related to the parity itself and/or to a corresponding group of data blocks. As an example of a direct relationship, the caching criterion can set a threshold number of parity updates. Upon reaching or exceeding that threshold, the parity caching criterion is satisfied for that parity. As another example, a most recently updated or most frequently updated caching algorithm can be applied to the parities. As an example of an indirect relationship, a parity caching criterion can include "hotness" of data. In other words, mechanisms can be employed to determine how frequently data blocks in the hybrid storage array are being updated within a given window of time. The storage manager (or some other monitoring component) can then group the frequency of updates by corresponding parity. In terms of stripes, the storage manager determines hot data stripes. If the frequency of updates grouped by parity is beyond a threshold, then the parity caching criterion is satisfied. The frequency of access can be measured in terms of number of accesses. The storage manager can then determine the parities corresponding to the hot data blocks and indicate those parities as ready for caching. As example illustrations, the storage manager can maintain a list of the parities ready for caching or set data fields (e.g., flags) associated with the parities in the storage array map to indicate activation of parity caching. A caching criterion is not necessarily reactive, as in the examples above. The storage manager can determine that an incoming (or ongoing) workload or job will access a set of data blocks beyond a threshold. The storage manager can determine the parities corresponding to those data blocks and activate parity caching for those data blocks that are expected to be or will be updated beyond the threshold. As mentioned later, a caching criterion is not necessarily employed. If the parity caching criterion is satisfied, then control flows to block 715. Otherwise, control flows to block 722.

At block 715, the storage manager determines a solid state storage device in which to cache the parity. A solid state storage device can be configured in advance to be the parity cache for a hybrid storage array. If the hybrid storage array includes multiple solid state storage devices and no particular one is specified to be a parity cache, a solid state storage device of the array can be selected. Examples of a device selection criterion include type of solid state storage device, manufacturer of solid state storage device, capacity of the solid state storage device, age of the solid state storage device, current use of the solid state storage device, etc. For instance, the oldest solid state storage device with the least capacity may be selected for parity caching to allow a newer solid state storage device with greater capacity to be used for data caching. The reverse may also be implemented for device selection (i.e., the newest SSD with most capacity selected).

At block 717, the storage manager indicates the selected solid state storage device to cache the parity.

At block 719, the storage manager indicates an inconsistent status for the parity at both the hard disk storage device location and the solid state storage device cache location. After indication of the selected solid state storage device and update of status for both locations, the operations at blocks 721 are similar to those in blocks 513 and 517 of FIG. 5.

At block 721, the storage manager writes the recalculated parity to the solid state storage device being used for parity caching and to the hard disk storage device location.

After confirmation that the parity has been updated at each location, the storage manager updates each status accordingly at block 723.

If the storage manager determined at block 713 that the parity caching criterion is not satisfied, then control flows to block 722.

At block 722, the storage manager indicates inconsistent status for the parity as stored in the hard disk storage device with respect to the storage manager cache. The storage manager indicates a status for the primary location, which is a hard disk storage device in this case, as dirty.

At block 727, the storage manager writes the recalculated parity to the hard disk storage device.

After confirmation that the parity has been updated at the hard disk storage device, the storage manager updates status of parity at the hard disk storage device to consistent with the storage manager cache at block 729.

Figure 8:
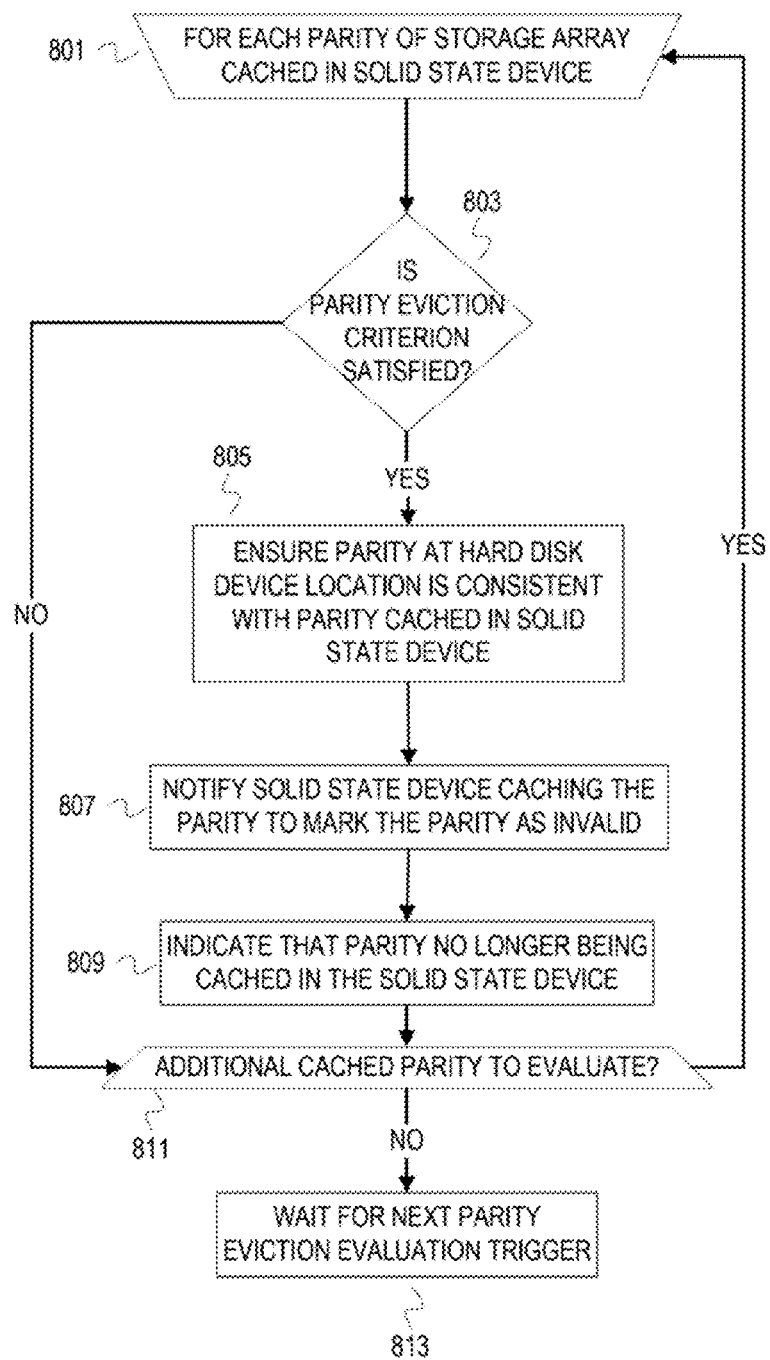
FIG. 8 depicts a flowchart of example operations for evicting cached parity from a solid state storage device in a hybrid storage array.

Although the space on a solid state storage device that can be used for parity caching is substantial, an eviction mechanism may still be implemented. It may be desirable to evict cached parity from a solid state storage device to regulate the parity caching based writes to the solid state storage device. FIG. 8 depicts a flowchart of example operations for evicting cached parity from a solid state storage device in a hybrid storage array. As with the above figures, FIG. 8 is described as if the operations are performed by an eviction process of a storage manager.

At block 801, the eviction process begins an eviction evaluation for each parity of the hybrid storage array that is cached in a solid state storage device of the array. Although these operations are presented as iterating over each cached parity, the claims are not constrained to iterating over each cached parity. An eviction mechanism can iterate over sets of cached parity that are less than the total cached parity. The eviction mechanism can be bound by time, can end early (e.g., after evicting x parities), and can be interrupted. In addition, the eviction mechanism may first collect information about the cached parity in an iterative manner, and then evaluate the collected information to determine which (if any) cached parity to evict. The eviction mechanism can be triggered based on time (e.g., periodically), an event or activity (e.g., number of updates to an array, transition in a workload, etc.), attempted caching of a new parity, consumption of a threshold amount of space on the solid state storage device allocated for parity caching, etc.

At block 803, the eviction process determines whether a parity eviction criterion is satisfied. The parity eviction criterion can depend upon the parity caching criterion. For instance, the parity eviction criterion can be in accordance with a least recently updated algorithm or a least frequently updated algorithm. The parity eviction criterion can be based on the data protected by the parity. For instance, the parity corresponding to the "coldest" data (i.e., data with the least updates within a sliding window of time or window of operations) may be evicted. If the parity eviction criterion is satisfied, then control flows to block 805. If it is not, then control flows to block 811.

At block 805, the eviction process ensures that the status of the parity at the hard disk storage device location is consistent with cache of the storage manager, if relevant. If the status is inconsistent, then the storage manager waits until the status is changed to consistent. After determining that the status is consistent or if the parity is not indicated in the storage manager cache, the storage manager can obtain a lock on data elements corresponding to the parity.

At block 807, the eviction process notifies the solid state storage device caching the parity to mark the parity as invalid. For example, the storage manager can send a TRIM command to the solid state storage device.

At block 809, the eviction process indicates that the parity is no longer being cached. For instance, the storage manager can clear or remove indication of the solid state storage device that was caching the parity. The storage manager can change a bit or flag that indicates whether the associated parity is SSD cached.

At block 811, the eviction process determines whether there is additional cached parity to evaluate for possible eviction. If not, then control flows to block 813. If there is an additional cached parity to evaluate for possible eviction, control flows back to block 801.

At block 813, the eviction process waits for the next parity eviction evaluation trigger.

Figure 9:
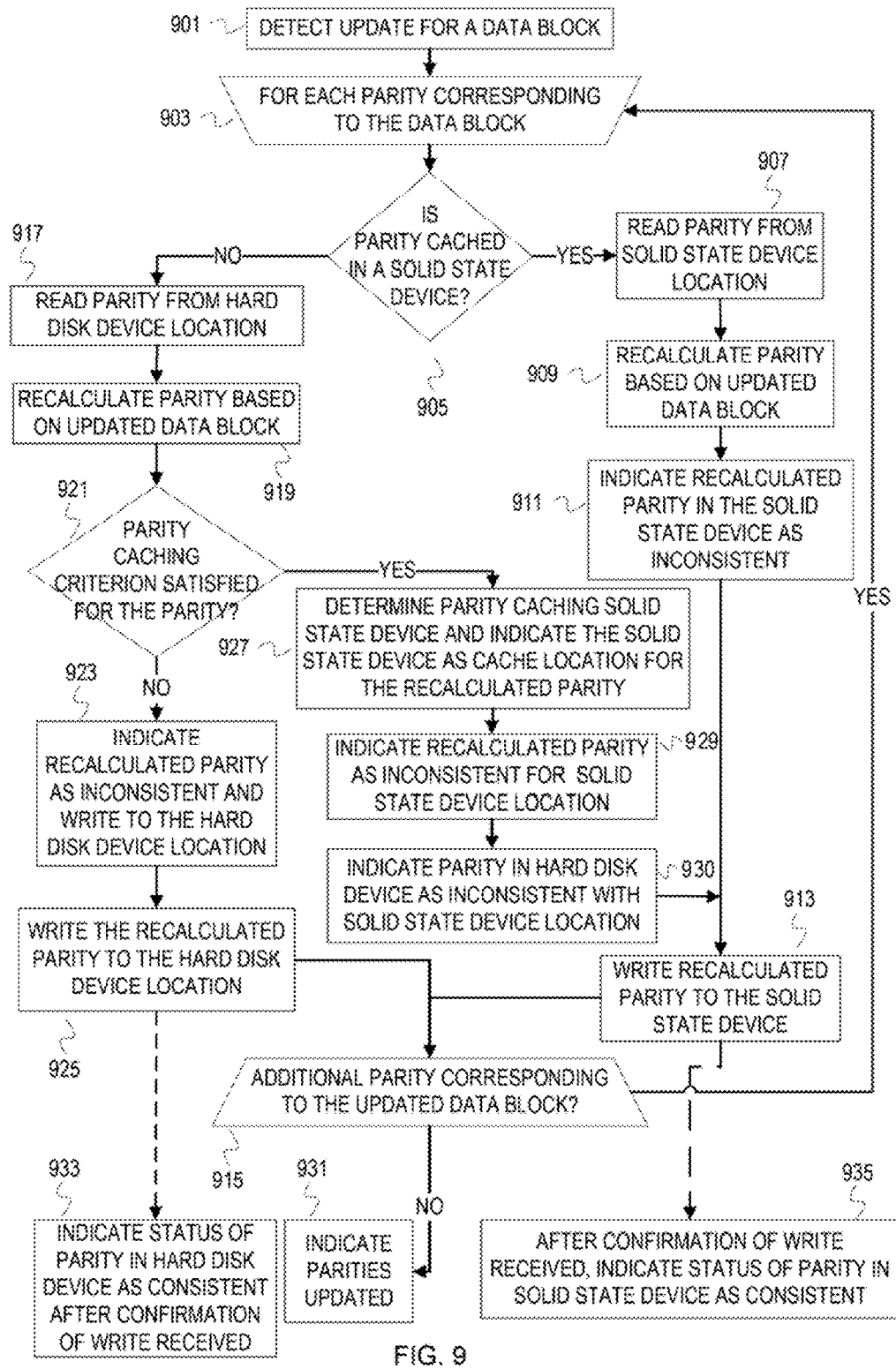
FIG. 9 is a flowchart of example operations for parity caching in a hybrid storage array that uses multiple parity protection.

The above flowcharts depict example operations for the case of single parity protection. FIG. 9 is a flowchart of example operations for parity caching in a hybrid storage array that uses multiple parity protection. As with the single parity Figures, the example operations of FIG. 9 are described as if performed by a storage manager. Operations in FIG. 9 are similar to some of the operations in FIGS. 5-7, but a cached parity is not written to the corresponding hard disk storage device while being cached. To reduce unnecessary repetition of operations and aid in understanding the disclosure, FIG. 9 does not depict certain operations. For instance, FIG. 9 does not depict determining locations, reading an impacted data block, or maintaining status of the impacted data block.

At block 901, a storage manager detects an update for a data block.

At block 903, the storage manager begins parity caching determination operations for each of m parity (m=1 . . . n, with n>1) that corresponds to the data block. The iterative process suggested by block 903 should not be used to constrain the claims. The process can be terminated early, can exit upon satisfaction of a condition, can be interrupted, etc.

At block 905, the storage manager determines whether parity m is cached in a solid state storage device. If so, then control flows to block 907. If the parity m is not cached, then control flows to block 917.

At block 917, the storage manager reads the parity m from its hard disk storage device location. Since a storage manager may handle write requests (from a same or different clients) targeting different data blocks but impacting a same parity, the storage manager can ensure the parity is either not cached in the storage manager or that the parity at the hard disk storage device location is consistent with the storage manager cache. The storage manager ensures that it is reading a consistent version of the parity m, and will wait if the parity m is currently inconsistent. Or the storage manager can skip to the next parity and return to the currently inconsistent parity later.

At block 919, the storage manager recalculates the parity m based on the updated data block.

At block 921, the storage manager determines whether a parity caching criterion is satisfied for the parity m. If the parity caching criterion is satisfied, then control flows to block 927. Otherwise, control flows to block 923.

At block 927, the storage manager determines a solid state storage device in which to cache the parity and indicates this device for the recalculated parity cache location. A solid state storage device can be configured in advance to be the parity cache for a hybrid storage array. If the hybrid storage array includes multiple solid state storage devices and no particular one is specified to be a parity cache, a solid state storage device of the array can be selected. Examples of device selection criteria are previously given with respect to block 715.

At block 929, the storage manager indicates status of the parity m for the solid state storage device location as inconsistent with the storage manager cache.

At block 930, the storage manager indicates status of the parity m as stored in the hard disk storage device location as inconsistent with the caching solid state storage device. Control flows from block 930 to block 913.

At block 913, the storage manager writes the recalculated parity to the solid state storage device being used for parity caching. Control flows from block 913 to block 915, as well as asynchronously to block 935.

At block 915, the storage manager determines whether there is an additional parity corresponding to the updated data block. If there is an additional parity corresponding to the updated data block, then control returns to block 903. Otherwise, control flows to block 931. At block 931, the storage manager indicates that m parities have been updated for the data block.

After confirmation that the parity m has been written to the SSD cache location, the storage manager updates parity status for the SSD cache location to indicate consistency with the storage manager cache at block 935.

If the storage manager determines at block 921 that the parity caching criterion is not satisfied, then control flows to block 923.

At block 923, the storage manager indicates status of the parity as stored in the hard disk storage device as inconsistent with the storage manager cache. This status is indicated for the hard disk storage device location alone, since the parity is not being cached.

At block 925, the storage manager writes the recalculated parity to the hard disk storage device. Control flows from block 925 to block 915, as well as asynchronously to block 933.

After confirmation that the parity has been updated at the hard disk storage device location, the storage manager updates parity status for the hard disk storage device location to consistent at block 933.

If the storage manager determines that the parity m is already cached at block 905, then control flows to block 907. At block 907, the storage manager reads the parity m from the caching SSD.

At block 909, the storage manager recalculates the parity based on the updated data block.

At block 911, the storage manager indicates parity status for the SSD location as inconsistent with the storage manager cache. Control flows to block 913 from block 911.

Figure 10:
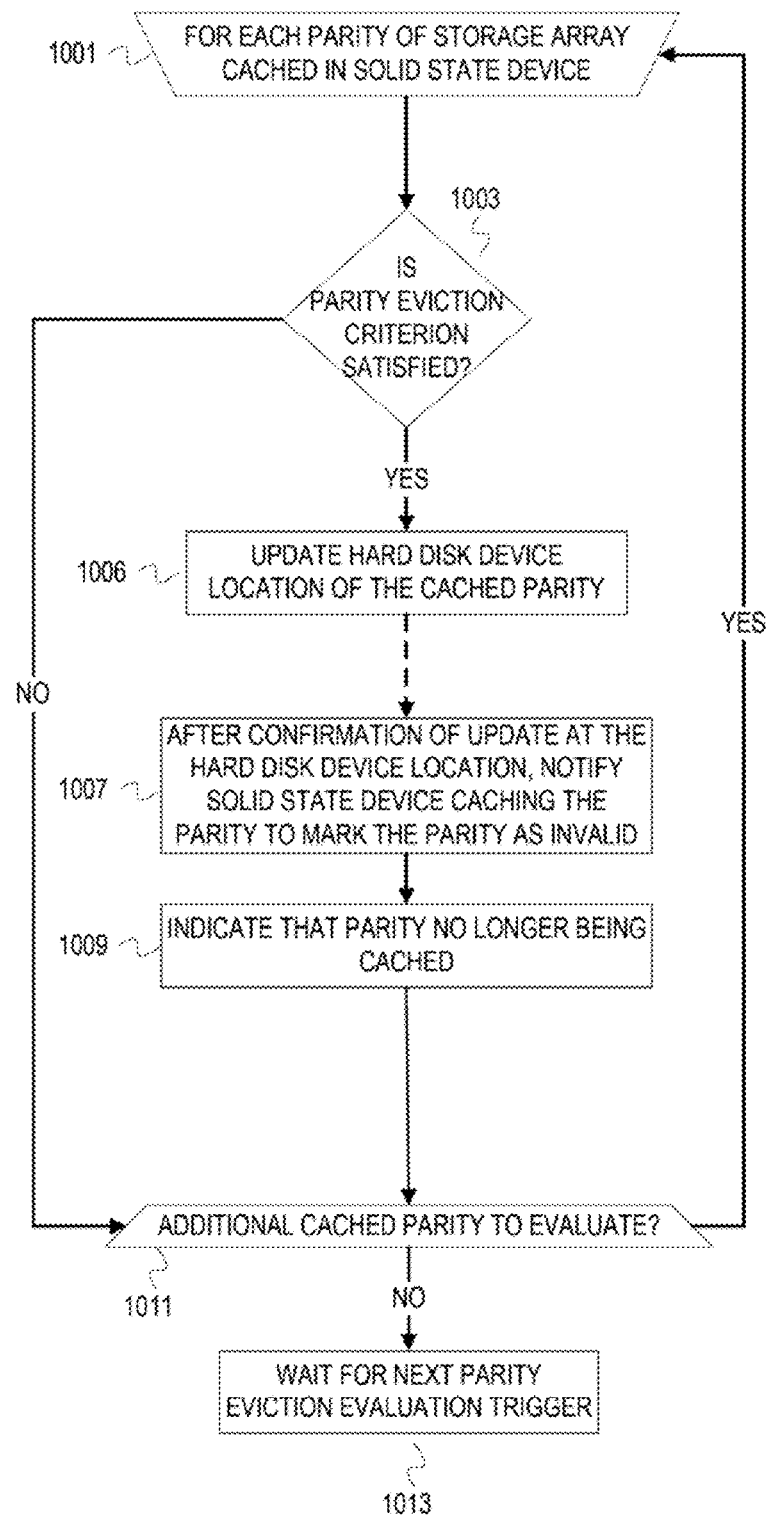
FIG. 10 is a flowchart of example operations for parity eviction from a solid state storage device cache in a hybrid storage array with multiple parity protection.

FIG. 10 is a flowchart of example operations for parity eviction from a caching solid state storage device in a hybrid storage array with multiple parity protection. FIG. 10 is similar to FIG. 8 with a deviation to accommodate updating a hard disk storage device parity that is inconsistent with the SSD cached parity.

At block 1001, an eviction process begins an eviction evaluation for each parity of the hybrid storage array that is cached in a solid state storage device of the array. Although these operations are presented as iterating over each cached parity, the claims are not constrained to iterating over each cached parity as discussed above with reference to FIG. 8. Similarly, the eviction process can be triggered with the various triggering criteria also discussed with respect to FIG. 8.

At block 1003, the eviction process determines whether a parity eviction criterion is satisfied. Various parity eviction criteria are discussed above with respect to block 803 of FIG. 8. If the parity eviction criterion is satisfied, then control flows to block 1005. If it is not, then control flows to block 1011.

At block 1006, the eviction process updates the hard disk storage device location for the parity in accordance with the SSD cached parity. The eviction process reads the parity value in the SSD cached location, determines the hard disk storage device location, and requests that the parity value be written to the hard disk storage device location.

At block 1007, the eviction process notifies the solid state storage device caching the parity to mark the parity as invalid after receiving confirmation that the hard disk storage device location has been updated. For example, the storage manager can send a TRIM command to the solid state storage device.

At block 1009, the eviction process indicates that the parity is no longer being SSD cached. For instance, the storage manager can clear or remove indication of the solid state storage device that was caching the parity. The storage manager can change a bit or flag that indicates whether the associated parity is SSD cached.

At block 1011, the eviction process determines whether there is additional cached parity to evaluate for possible eviction. If not, then control flows to block 1013. If there is an additional cached parity to evaluate for possible eviction, control flows back to block 1001.

At block 1013, the eviction process waits for the next parity eviction evaluation trigger.

Variations

Although the examples refer to maintenance of dirty bits, other techniques can be used to ensure validity and preserve consistency of parity (and data). As examples, consistency and validity of parity can be preserved with locking, atomic transactions, etc.

The examples often refer to a "storage manager." The storage manager is a construct used to refer to implementation of functionality for parity caching in a solid state storage device of a hybrid storage array. This construct is utilized since numerous implementations are possible. A storage manager may be a server, filer, controller, a particular component or components of machine (e.g., a particular circuit card enclosed in a housing with other circuit cards/boards), machine-executable program or programs (e.g., a storage operating system), firmware, a circuit card with circuitry configured and programmed with firmware for managing storage arrays, etc. The term is used to efficiently explain content of the disclosure. The storage manager can also be referred to as a managing storage node. Although the examples refer to operations being performed by a storage manager, different entities can perform different operations. For instance, a dedicated co-processor or application specific integrated circuit can calculate parity.

The examples in FIGS. 1-4 depict a hybrid storage array that is external to the storage manager. However, at least part of the array may be housed within the storage manager itself. The storage manager can have circuitry to manage a storage array that includes storage devices inserted into bays of the storage manager, storage devices connected directly to ports of the storage manager, and storage devices separated from the storage manager by at least one network element.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 511 and 513 can be performed in parallel or concurrently. With respect to FIGS. 7 and 9, a caching criterion is not necessary. Parity can be cached upon update and management of the cached parity rely on a clean-up or eviction criterion or criteria. In addition, the update to indicate inconsistency between a caching SSD and an HDD for a parity can occur after confirmation of a successful write to the caching SSD instead of at block 930 as depicted in FIG. 9.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

Aspects of this disclosure are described with reference to flowchart illustrations and/or block diagrams. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 11:
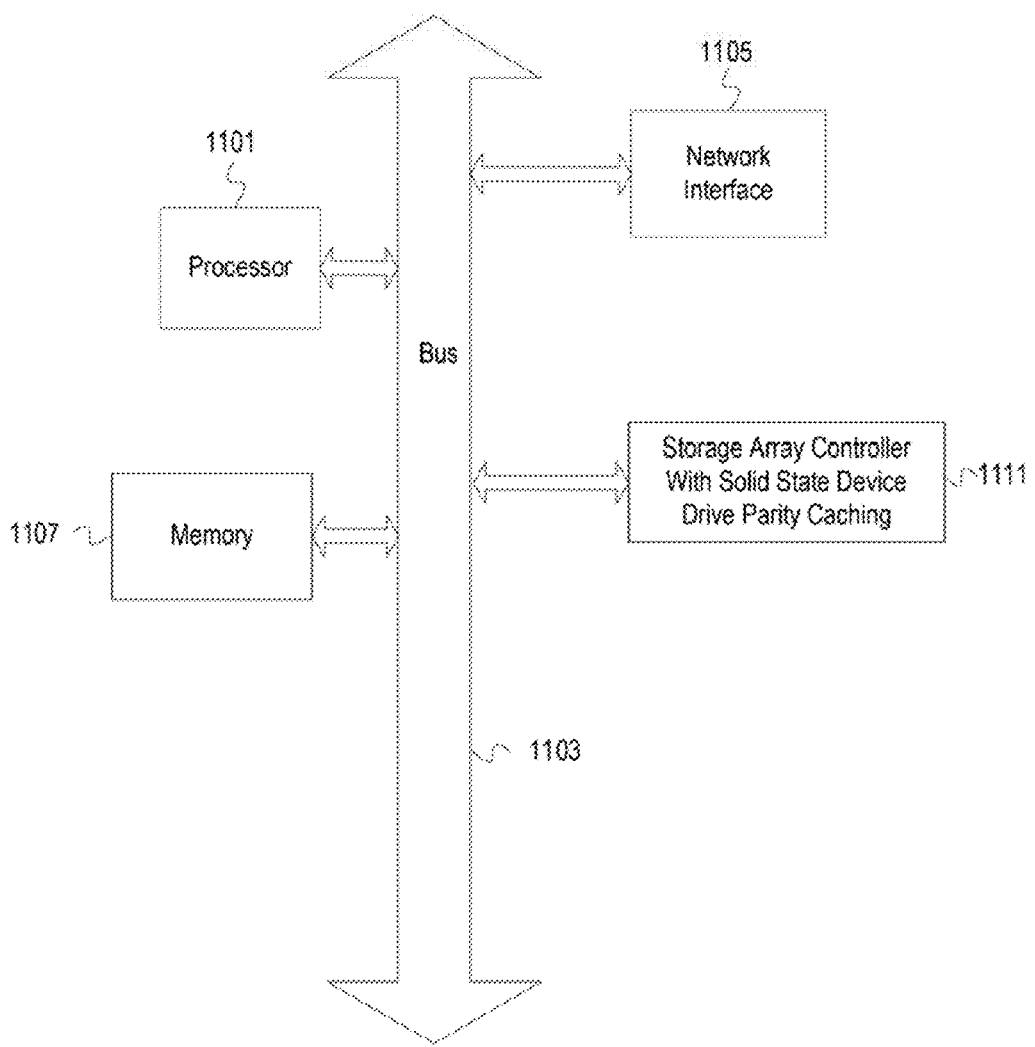
FIG. 11 depicts an example computer system with a storage array controller that caches parity on a constituent solid state storage device.

FIG. 11 depicts an example computer system with a storage array controller that caches parity on a solid state storage device of a hybrid storage array. The computer system includes a processor unit 1101 (possibly including multiple processors, multiple cores, multiple nodes, and/or implementing multi-threading, etc.). The computer system includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1103 (e.g., PCI, ISA, PCI-Express, HyperTransport® bus, InfiniBand® bus, NuBus, etc.) and a network interface 1105 (e.g., a Fiber Channel interface, an Ethernet interface, an internet small computer system interface, SONET interface, wireless interface, etc. The system also includes a storage array controller 1111. The storage array controller 1111 caches parities of a hybrid storage array in a constituent solid state storage device. The storage array controller also evicts cached parity when a parity eviction criterion is met. Any one of the previously described functionalities may be partially (or entirely) implemented in hardware and/or on the processing unit 1101. For example, the functionality may be implemented with an application specific integrated circuit, in logic implemented in the processing unit 1101, in a coprocessor on a peripheral device or card, etc. Further, realizations may include fewer or additional components not illustrated in FIG. 11 (e.g., video cards, audio cards, additional network interfaces, peripheral devices, etc.). The processor unit 1101 and the network interface 1105 are coupled to the bus 1103. Although illustrated as being coupled to the bus 1103, the memory 1107 may be coupled to the processor unit 1101.

While the aspects of the disclosure are described with reference to various implementations and exploitations, it will be understood that these aspects are illustrative and that the scope of the claims is not limited to them. In general, techniques for caching parity and evicting parity in a hybrid storage array as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses the term "parity." Since this disclosure relates to storage arrays, it should be clear that parity refers to fault tolerance data that can be used to reconstruct data (e.g., user data or application data) after a storage device failure. However, the possibility exists that interpretations will be asserted that disregard this disclosure since parity can have other meanings. For at least this reason, the claims will also refer to reconstruction information since parity is used to reconstruct data on a failed storage device. In addition, the description refers to parity when parity value would be more appropriate. This is done for ease of explanation. Parity for a set/group/plurality of data units can refer to any parity value that protects the data units. A parity value is a particular instance of that parity.

This description also uses the term "data blocks." This is a familiar term within the industry, but it is susceptible to variations in meaning. For this disclosure, a data block is a unit of data that is read from or written to a storage array. The claims will refer to data units to avoid any unintended interpretations or unnecessary definitions of data blocks based on a particular technology.

In relation to the above terms, the claims will not refer to stripes. Although this is a common term used when data striping is employed, the claims will simply refer to a groups or set of data units protected or corresponding to a parity.

What is claimed is:

1. A method comprising:
   determining, after detecting an update that impacts a first data unit of a plurality of data units that a row parity for the plurality of data units is stored on a first hard disk storage device of a plurality of hard disk storage devices and a diagonal parity for the plurality of data units is stored on a second hard disk storage device of the plurality of hard disk storage devices, wherein a storage array at least includes the plurality of hard disk storage devices and a solid state storage device;
   after reading a first value for the row parity from the first hard disk storage device and a first value for the diagonal parity from the second hard disk storage device, calculating a second value for the row parity based, at least in part, on the first value for the row parity and an updated first data unit and a second value for the diagonal parity based, at least in part, on the first value for the diagonal parity and the updated first data unit;
   indicating with a first indication a change in the row parity with respect to the row parity stored in the first hard disk storage device, with a second indication that the row parity is stored in the solid state storage device, with a third indication a change in the diagonal parity with respect to the diagonal parity stored in the second hard disk storage device, and with a fourth indication that the row parity is stored in the solid state storage device; and
   requesting that the second value for the row parity and the second value for the diagonal parity be written to the solid state storage device.

2. The method of claim 1, further comprising:
determining, using the second indication, that the row parity is stored in the solid state storage device in response to detecting a second update that impacts a second data unit of the plurality of data units;
reading the second value for the row parity from solid state storage device; and
requesting that a third value for the row parity be written to the solid state storage device after calculating the third value based, at least in part, on the second value for the row parity and the second update.

3. The method of claim 1, further comprising maintaining the first indication for the row parity and the second indication for the row parity in a storage array manager cache.

4. The method of claim 1, further comprising:
determining, using the second indication, that the row parity is stored in the solid state cache; and
reading the row parity from the solid state cache.

5. The method of claim 1, further comprising:
storing the second value for the row parity in a storage array manager cache.

6. The method of claim 1, further comprising requesting that the second value for the row parity also be written to the first hard disk storage device.

7. The method of claim 6, further comprising resetting the first indication subsequent to the second value written to the first hard disk storage device.

8. The method of claim 1, further comprising maintaining the first indication for the row parity in a storage array manager cache.

9. The method of claim 8, further comprising maintaining a second indication for the row parity in a storage array manager cache.

10. The method of claim 8, further comprising:
determining that the row parity has been selected for eviction from the solid state storage device; and
requesting that the second value for the row parity be written to the first hard disk storage device for the row parity in response to determining that the row parity has been selected for eviction from the solid state storage device.

11. A non-transitory machine-readable medium having stored thereon instructions for performing a method for tracking reconstruction information comprising machine executable code, which when executed by at least one machine, causes the at least one machine to:
determine, after detection of an update that impacts a first data unit of a plurality of data units, that row reconstruction information for the plurality of data units is stored on a first hard disk storage device of a plurality of hard disk storage devices of a storage array and that diagonal reconstruction information for the plurality of data units is stored on a second hard disk storage device of the plurality of hard disk storage devices;
read a first value for the row reconstruction information from the first hard disk storage device and a first value for the diagonal reconstruction information from the second hard disk storage device;
indicate with a first indication a change in the row reconstruction information with respect to the row reconstruction information stored in the first hard disk storage;
after calculation of a second value for the row reconstruction information based, at least in part, on the first value for the row reconstruction information and an updated first data unit, indicate with a second indication that the row reconstruction information is cached in a solid state storage device of the storage array;
indicate with a third indication a change in the diagonal reconstruction information with respect to the diagonal reconstruction information stored in the second hard disk storage;
after calculation of a second value for the diagonal reconstruction information based, at least in part, on the first value for the diagonal reconstruction information and the updated first data unit, indicate with a fourth indication that the diagonal reconstruction information is cached in the solid state storage device of the storage array; and
request that the second value for the row reconstruction information and the second value for the diagonal reconstruction information be written to the solid state storage device.

12. The machine-readable medium of claim 11, wherein the machine executable code further causes the at least one machine to:
determine that the row reconstruction information is cached in the solid state storage device in response to detection of a second update that impacts a second data unit of the plurality of data units;
read the second value for the row reconstruction information from the solid state storage device; and
request that a third value for the row reconstruction information be cached in the solid state storage device after calculation of the third value based, at least in part, on the second value and the second update.

13. The machine-readable medium of claim 11, wherein the machine executable code further causes the at least one machine to maintain the first indication for the row reconstruction information and the second indication for the row reconstruction information in a storage array manager cache.

14. The machine-readable medium of claim 11, wherein the machine executable code further causes the at least one machine to request that the second value also be written to the first hard disk storage device.

15. The machine-readable medium of claim 11, wherein the machine executable code further causes the at least one machine to maintain the second indication for the row reconstruction information in a storage array manager cache.

16. The machine-readable medium of claim 11, further comprising program code to:
determine that the row reconstruction information has been selected for eviction from the solid state storage device; and
request that the second value for the row reconstruction information be written to the first hard disk storage device for the row reconstruction information in response to a determination that the row reconstruction information has been selected for eviction from the solid state storage device.

17. A computing device comprising:
one or more memories containing machine readable medium comprising machine executable code having stored thereon instructions for performing a method for storing row reconstruction information and diagonal reconstruction information; and
a processor in communication with the one or more memories and configured to:
determine, after detection of an update that impacts a first data unit of a plurality of data units, that row reconstruction information for the plurality of data units is stored on a first hard disk storage device of a plurality of hard disk storage devices of a storage array and that diagonal reconstruction information for the plurality of data units is stored on a second hard disk storage device of the plurality of hard disk storage devices of a storage array;

read a first value for the row reconstruction information from the first hard disk storage device and a first value for the diagonal reconstruction information from the second hard disk storage device;

indicate with a first indication a change in the row reconstruction information with respect to the row reconstruction information stored in the first hard disk storage;

after calculation of a second value for the row reconstruction information based, at least in part, on the first value and an updated first data unit, indicate with a second indication that the row reconstruction information is cached in a solid state storage device of the storage array;

indicate with a third indication a change in the diagonal reconstruction information with respect to the diagonal reconstruction information stored in the second hard disk storage;

after calculation of a second value for the diagonal reconstruction information based, at least in part, on the first value for the diagonal reconstruction information and the updated first data unit, indicate with a fourth indication that the diagonal reconstruction information is cached in the solid state storage device of the storage array; and request that the second value for the row reconstruction information and the second value for the diagonal reconstruction information be written to the solid state storage device.

18. The computer device of claim 17, wherein the processor is further configured to:
   determine that the row reconstruction information is cached in the solid state storage device in response to detection of a second update that impacts a second data unit of the plurality of data units;
   read the second value for the row reconstruction information from the solid state storage device; and
   request that a third value for the row reconstruction information be cached in the solid state storage device after calculation of the third value based, at least in part, on the second value for the row reconstruction information and the second update.

19. The computing device of claim 17, wherein the processor is further configured to cause the computing device to maintain the first indication and the second indication for the row reconstruction information in a cache memory of the computing device.

* * * * *